(12) United States Patent
Higgins

(10) Patent No.: US 7,729,592 B2
(45) Date of Patent: Jun. 1, 2010

(54) MANAGING A RECORDING DEVICE

(75) Inventor: Jamie M. Higgins, Crawley (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 989 days.

(21) Appl. No.: 10/560,715

(22) PCT Filed: Jun. 10, 2004

(86) PCT No.: PCT/IB2004/001961

§ 371 (c)(1),
(2), (4) Date: Dec. 15, 2005

(87) PCT Pub. No.: WO2004/112018

PCT Pub. Date: Dec. 23, 2004

(65) Prior Publication Data

US 2006/0153014 A1    Jul. 13, 2006

(30) Foreign Application Priority Data

Jun. 17, 2003   (GB) ................................. 0313972.2

(51) Int. Cl.
*H04N 5/91* (2006.01)
*H04N 7/00* (2006.01)
*H04N 7/26* (2006.01)

(52) U.S. Cl. ............................. 386/83; 386/46; 386/95; 386/109

(58) Field of Classification Search ...................... 386/1, 386/46, 83, 95, 124–126
See application file for complete search history.

(56) References Cited

U.S. PATENT DOCUMENTS

| 6,577,812 B1 | 6/2003 | Kikuchi et al. | |
| 7,212,725 B2* | 5/2007 | Gunji et al. | 386/46 |
| 7,224,886 B2* | 5/2007 | Akamatsu et al. | 386/83 |
| 7,254,318 B2* | 8/2007 | Imada et al. | 386/112 |
| 2002/0136538 A1 | 9/2002 | Chen | |
| 2002/0174430 A1* | 11/2002 | Ellis et al. | 725/46 |
| 2003/0099460 A1 | 5/2003 | Imada et al. | |

FOREIGN PATENT DOCUMENTS

| JP | 8065616 A | 3/1999 |
| WO | 0191460 A2 | 11/2001 |

* cited by examiner

*Primary Examiner*—Thai Tran
*Assistant Examiner*—Marc Dazenski

(57) ABSTRACT

A method for managing the recording capacity of a recording device, independently of user involvement, comprising receiving (104, 154) data representing a plurality of recording modes of the recording device; identifying (114) one or more recording modes which may be used to record an item using the prevailing unreserved recording capacity; and arranging (128, 162) for the recording of the item using a recording mode selected (122, 160) based on a preference, the arrangement including, where necessary, adapting (120, 170) one or more pending or previously recorded items.

19 Claims, 6 Drawing Sheets

MANAGING A RECORDING DEVICE

The present invention relates to a method and system for managing the recording of content on a recording device, in particular where the recording capacity of the recording device is finite.

Recordable (or write-readable) media such as recordable optical disc and hard disc drives (HDD) offer new options for the storage and retrieval of audio-visual (AV) content (for example video and audio programme items). Common to most recording media is the provision of more than one recording mode, each mode perhaps corresponding to a certain quality level (fidelity) of recording. Although such new media may have the ability to store a larger quantity of content compared to legacy systems such as VHS, nevertheless the capacity of the media remains finite.

There currently exist AV products and systems which allow selection of a recording mode from a known set of modes in order to record an item of content. A disadvantage is that the selection is performed manually by a user. A further disadvantage is that a system may comprise more than one recording device, wherein each device has a different set of recording modes, making selection yet more complex or difficult for the user.

Considering an individual recording device, a disadvantage is that the recording mode used for a new item is constrained so that its capacity occupies no more than the present unreserved recording capacity, for example preventing the recording of the item at the desired level of quality. A further disadvantage is that to schedule the recording of an item of unknown duration, an estimate of the likely duration must first be made in order to select a suitable recording mode to enable the item to be successfully recorded using the unreserved capacity. A drawback of such an approach is that the selected recording mode may not be optimum or reflect the user's preference. Overall, the utilisation of the recording capacity is likely to be inefficient and/or the recording will not correspond to the user's preference.

It is an object of the present invention to improve on the known art.

In accordance with the present invention there is provided a method for managing the recording capacity of a recording device when scheduling the recording of an item, independently of user involvement, comprising:
  receiving data representing a plurality of recording modes of the recording device;
  for each recording mode, calculating the capacity required to record the item using said mode;
  obtaining the unreserved recording capacity of the recording device;
  identifying recording modes for which the calculated capacity is less than the unreserved recording capacity; and
  where one or more recording modes are identified,
    selecting an identified recording mode based on a preference; and
    where an identified recording mode is selected, scheduling the recording of the item using the selected recording mode.

Advantageously, the method identifies that one or more recording modes are available to record the item and that one of the identified modes matches a preference. Where this is not the case, preferably the method adapts at least one reserved item and repeats the method commencing with the obtaining step.

A preference may be a default preference, for example to select the recording mode associated with the best quality for the item of content in question given the unreserved recording capacity. In addition or alternatively, the preference may be associated with the item itself, for example providing a range of acceptable qualities; such a preference might perhaps also indicate that the item can be deleted where circumstances require deference to a more important item.

According to another aspect, the present invention provides a method for managing the recording capacity of a recording device when recording an item, independently of user involvement, comprising:
  receiving data representing a plurality of recording modes of the recording device;
  selecting a recording mode based on a preference;
  commencing the recording of the item using the selected recording mode; and
  while recording the item:
    obtaining the unreserved recording capacity; and
    where the unreserved recording capacity is less than a pre-determined amount, adapting at least one reserved item.

Advantageously, while recording an item the present invention obtains the unreserved recording capacity and, where the unreserved recording capacity is less than a pre-determined amount, adapts at least one reserved item. The unreserved recording capacity is obtained as a result of a calculation involving the total capacity and the reserved capacity. The pre-determined amount can correspond to the recording capacity needed for the item using the selected recording mode. Alternatively, the pre-determined amount can correspond to a particular recording time using the selected recording mode, such times preferably being, 1 minute, 15 minutes and 60 minutes.

In the above methods, a reserved item is an item which contributes to the reserved capacity, for example an item presently being recorded, a pending item and a previously recorded item. Advantageously, where the reserved item is an item presently being recorded, adapting said item comprises selecting an alternative recording mode based on the preference and continuing the recording of the item using the selected alternative recording mode. Where the reserved item is an item previously recorded, adapting said item comprises selecting an alternative recording mode based on the preference and re-recording the item using the selected alternative recording mode. The recorded portion of an item presently being recorded can also be regarded as such a previously recorded item. Where the reserved item is a pending item, adapting said item comprises selecting an alternative recording mode based on the preference. Adapting a reserved item can comprise deleting the reserved item based on the preference. The preference may be embedded within the method or, prior to selecting a recording mode, the preference may be receivable from a suitable external source.

According to a further aspect, the present invention provides a system for managing the recording capacity of a recording device, independently of user involvement, the system comprising:
  a processing means operable, when scheduling the recording of an item, to:
    receive data representing a plurality of recording modes of the recording device;
    obtain the unreserved recording capacity of the recording device;
    for each recording mode, calculate the capacity required to record the item using said mode;
    identify recording modes for which the calculated capacity is less than the unreserved recording capacity;

where one or more recording modes are identified, select an identified recording mode based on a preference; and schedule the recording of the item using the selected recording mode;

and, when recording an item to:

receive data representing a plurality of recording modes of the recording device;

select a recording mode to record an item based on a preference;

commence the recording of the item using the selected recording mode; and while recording the item:

obtain the unreserved recording capacity; and where the unreserved recording capacity is less than a pre-determined amount, adapt at least one reserved item;

an interface operable to exchange data between the processing means and the recording device; and a recording device operable to co-operate with the processing means.

An advantage of the present invention is that the finite capacity of a recording device can be managed independently of user involvement. For a particular item, an appropriate recording mode is automatically selected based on the unreserved recording capacity and a preference, which preference can range from one or more default criteria to more detailed criteria. Advantageously, where items have associated individual preferences, adaptations can be made to reserved items in order to accommodate new items whilst also ensuring each of said reserved items remains within the scope of its individual preference. Furthermore such adaptations can be made on the fly to accommodate programmes which overrun or whose duration is uncertain prior to or during recording.

Embodiments of the invention will now be described, by way of example only, with reference to the accompanying drawings in which:

FIG. 4 is a schematic representation of an adaptation of a reserved item according to the method of FIG. 1a.

In the following description the term 'recording capacity' refers to the capacity of media used for recording AV content. AV content includes one or more programme items, also referred to as 'items', for example one or more portions of, or entire, TV and radio shows, audio tracks, and associated information such as metadata. The term 'reserved recording capacity' refers to media capacity occupied by items, termed 'reserved items', which are scheduled for recording or have previously been recorded. The term 'unreserved recording capacity' refers to media capacity not occupied by reserved items. It is pertinent to note that reserved items can be adapted, thereby altering the 'reserved recording capacity' and thereby the corresponding 'unreserved recording capacity'. The term 'recording device' refers to apparatus used to record items for subsequent replay; examples include VCR, DVD recorders, HDD-based recorders such as TiVo. A 'recording mode' refers to a mode by which a recording device records an item on the media. Typically, each recording mode of a recording device can denotes a different quality (fidelity) of recording. The term 'preference' is associated with one or more items and comprises one or more parameters; for example it can define a set of recording modes which are acceptable for the associated item.

Figure 1A:
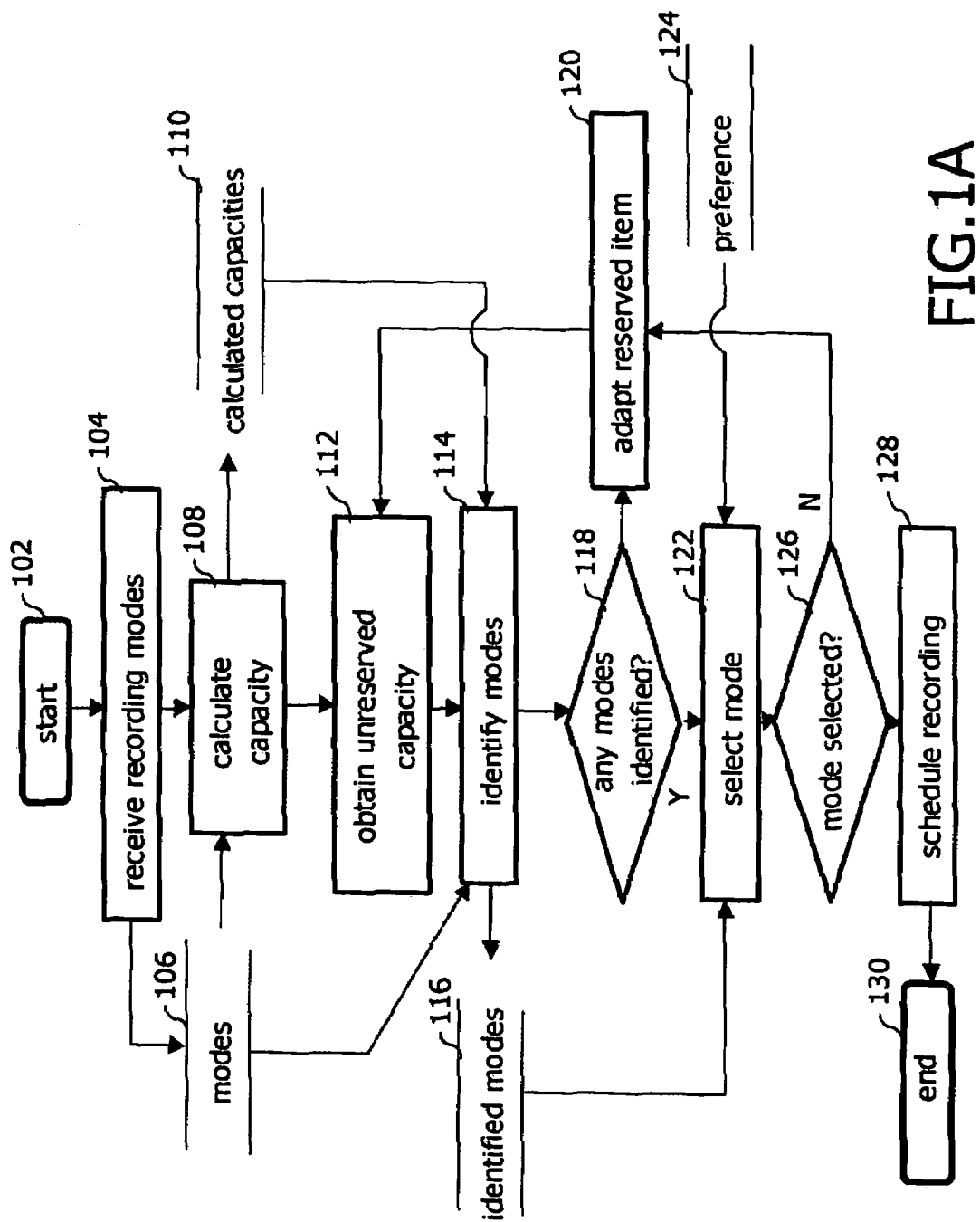
FIG. 1a is a flow diagram of a method for managing the recording capacity of a recording device when scheduling the recording of an item.

FIG. 1a shows a flow diagram of a method for managing the recording capacity of a recording device when scheduling the recording of an item. The method starts at 102 and receives 104 data representing a plurality of recording modes 106 of the recording device. This can be achieved in various ways readily identifiable by the skilled person, for example by reading the modes from the recording device or having modes for various recording devices pre-loaded and then identifying the particular recording device to the method. In respect of a particular recording device, for each recording mode 106, the method calculates 108 the capacity 110 required to record the item using said mode. As an example, the calculated capacity is the amount of media storage (such as Megabytes) to be reserved to record the item using said mode. Next, the method obtains 112 the unreserved recording capacity of the recording device; this is provided by the recording device or alternatively is derived from data describing the total capacity and present reserved capacity. Recording modes 116 are identified 114, each of which the calculated capacity 110 is less than the unreserved recording capacity. Where one or more recording modes are identified 118, the method selects 122 one of the identified recording modes 116 based on a preference 124 and, where an identified recording mode is selected 126, the recording of the item using the selected recording mode is scheduled 128. The method ends at 130.

Selection of an identified recording mode is based on a preference. One option is to use a preference which applies to all items, such as to ensure the selection of an identified recording mode corresponding to the best quality recording that is possible (for the given unreserved recording capacity). An advantage is that such a preference can be a default parameter built-in to a product. Another option, as an addition or alternative, is to use a number of different preferences, each associated with a particular item; for example, a preference might indicate that an item to which it is associated is to be 'archived' or 'timeshifted'—such attributes could then explicitly or implicitly determine an acceptable range of recording modes for the item (for example, 'archive' could determine that acceptable modes are those which correspond to relatively high quality recording). Furthermore, the content of the item can form part of the preference of an item—for example, lack of picture detail could impose a ceiling (upper limit) on the range of recording modes for a cartoon or animated item. Yet further, the preference can indicate the relative importance of an item—for example, allowing such an item to be deleted to release capacity for a more important item to be recorded. Although not shown in FIG. 1a, a preference can be received by the method prior to the selection step.

Where an identified recording mode is selected 126, the recording of the item using the selected recording mode is scheduled 128. Scheduling may be performed using any suitable method. An example is the programming of a timed event which comprises parameters relevant to the programme (such as, for a TV show, the station identifier and start time) and the selected recording mode. It is desirable to retain the preference information for possible subsequent reference in the case where the associated reserved item (in this case a pending item) is required to be adapted. Other examples of reserved items include a presently recorded item and a previously recorded item. A reserved item is able to be adapted depending on the preference.

In the case where no recording modes were identified 118 or an identified recording mode 116 was not selected 126, preferably the method then adapts 120 at least one reserved item and repeats the method commencing at the step of obtaining 112 the unreserved capacity.

Adapting a reserved item causes the reserved capacity occupied by the reserved item to be altered. In a typical situation, the reserved capacity occupied by a reserved item is reduced in order to correspondingly increase the unreserved capacity and thereby allow a new item to be accommodated within the finite capacity of the recording device. The alternative is also possible such that the reserved capacity occupied by a reserved item is increased. For example prior to commencing the recording of a scheduled (that is, pending) reserved item, its recording mode may be changed (within the scope of the preference associated with the item) in order to enhance the recorded quality of the item. Preferably an item is recorded using a recording mode corresponding to the highest possible quality (within the scope of the preference and the unreserved recording capacity); this for example allows, where circumstances require, the item to be subsequently adapted by re-recording at a reduced quality using an alternative recording mode. This aspect is further discussed in relation to FIGS. 4 and 5 below.

Figure 1B:
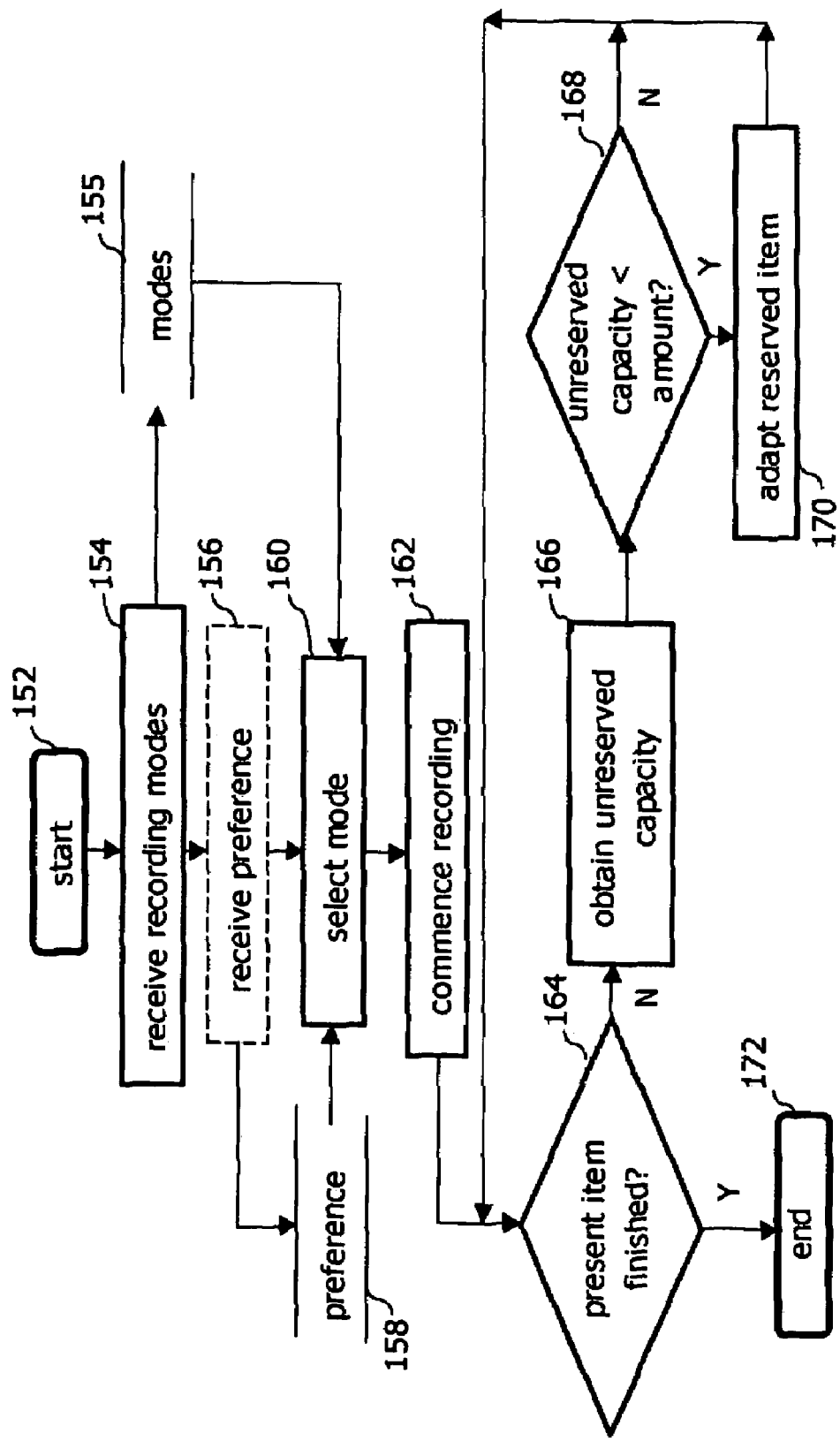
FIG. 1b is a flow diagram of a method for managing the recording capacity of a recording device when recording an item.

FIG. 1b shows a flow diagram of a method for managing the recording capacity of a recording device when recording an item. The method starts at 152 and receives 154 data representing a plurality of recording modes 155 of the recording device in similar fashion as described earlier in relation to FIG. 1a. Optionally, a preference 158 is received 156, for example from a user interface or a network; otherwise, preference 158 is available to the method as a default parameter set, as described earlier. The method then selects 160 a recording mode based on preference 158, and commences 162 the recording of the item using the selected recording mode, for example by issuing suitable commands to the recording device. While recording the item, the method obtains 166 the unreserved recording capacity, for example using similar mechanisms to those described in relation to FIG. 1a. Where the unreserved recording capacity is determined 168 to be less than a pre-determined amount, the method then adapts 170 at least one reserved item. When the presently recorded item is determined 164 to have finished, the method ends at 172.

Where the unreserved recording capacity is determined to be less than a pre-determined amount, the method enables one or more reserved items to be adapted on the fly. In this way, the reserved recording capacity can be adjusted to decrease and thereby the unreserved recording capacity to increase such that it then is more than the pre-determined amount. An advantage is that the presently recorded item is allowed to be recorded in its entirety in cases where apparently insufficient capacity is available. A further advantage is that this can be achieved whilst also ensuring appropriate recording modes are used for pending items and previously recorded items, each according to its associated preference. It should also be noted that reserved items can be adapted so that the reserved recording capacity is increased, for example to permit use of a higher quality recording mode at the time when a pending item is actually recorded.

One example of a pre-determined amount is where it corresponds to the recording capacity needed for the presently recorded item using the selected recording mode. In theory, this could optimise capacity utilisation by delaying adaptation of one or more reserved items until the circumstance where it is absolutely necessary. In practice, such adaptation is not instantaneous, giving rise to the risk that capacity may not be released by the adaptation in time to continue recording the present item. Preferably, the pre-determined amount corresponds to a number of minutes of recording time using the selected recording mode, thereby giving time to perform the necessary adaptation of the one or more reserved items whilst recording of the present item continues.

A first example is where the pre-determined amount corresponds to 1 minute of recording time using the selected recording mode. Within this timescale, adaptation that requires selection of alternative recording modes is deemed to be generally achievable, for example in relation to pending items. Similarly adaptation by means of deletion in relation to pending or previously recorded items is also deemed to be generally achievable. Where the recording device allows, adaptation which utilises re-recording of a previously recorded item might be achievable, for example in the case of a recording device which permits recording at rates much faster than real-time, such as a device utilising a Hard Disc Drive (HDD). Clearly, in this example, the method needs to accurately and frequently monitor the unreserved capacity.

A second example is where the pre-determined amount corresponds to 15 minutes of recording time using the selected recording mode. Within this timescale, in addition to selection of alternative recording modes or deletion in relation to a reserved item, adaptation which utilises re-recording is achievable, for example in the case of a recording device which permits recording at rates somewhat faster than real-time, such as a device utilising a DVD recorder.

Finally, a third example is where the pre-determined amount corresponds to 60 minutes of recording time using the selected recording mode. Within this timescale, again in addition to selection of alternative recording modes or deletion in relation to a reserved item, adaptation which utilises re-recording is achievable, for example in the case of a recording device which permits recording at rates close to real-time, such as a device utilising tape recording.

A reserved item can comprise the item presently being recorded and adapting such an item comprises selecting an alternative recording mode based on the preference and continuing the recording of the item using the selected alternative recording mode. While recording the item, the recording mode for an item can be re-selected based on the preference resulting in selecting an alternative recording mode, the recording of the item continuing using the alternative recording mode. This enables a portion of the item to occupy a different (for example, smaller) capacity compared to the preceding recorded portion of the item (that is, the portion recorded using the previous recording mode). Optionally, the method can also re-record the preceding recorded portion of the item using the selected alternative recording mode, thereby enabling this portion to occupy a different capacity.

A reserved item can comprise an item previously recorded and adapting such an item comprises selecting an alternative recording mode based on the preference and re-recording the item using the selected alternative recording mode. This is the general case for any previously recorded item and includes the recorded portion of a presently recorded item mentioned above. A recorded item can be recorded using any alternative recording mode based on the preference, for example allowing in theory a higher quality recording to replace a lower quality recording. In practice, a recording mode usually introduces losses due to the level of compression used; such losses are not recoverable. Therefore, it is preferable to initially record items using a recording mode which permits the highest quality attainable given the prevailing unreserved capacity and preference. This strategy ensures that lower quality recording modes are potentially available (that is, based on the preference) should the need arise to re-record the item.

A reserved item can comprise a pending item and adapting such an item comprises selecting an alternative recording mode based on the preference. A pending item is an item scheduled for recording at some future time. As an alternative to selecting an alternative recording mode based on the preference, adapting a pending item can be achieved by repeating the method for managing the recording capacity of a recording device when scheduling the recording of an item. In the latter case, an advantage of such an adaptation, unlike for a recorded item, is that a higher quality recording mode can be selected in circumstances where, for whatever reason, a larger unreserved capacity is available than was the case when the pending item was previously scheduled.

A reserved item can also be adapted by deleting the reserved item based on the preference.

In order to adapt a reserved item, it is of course necessary to retain its respective preference data. A reserved item can be adapted more than once.

Figure 2:
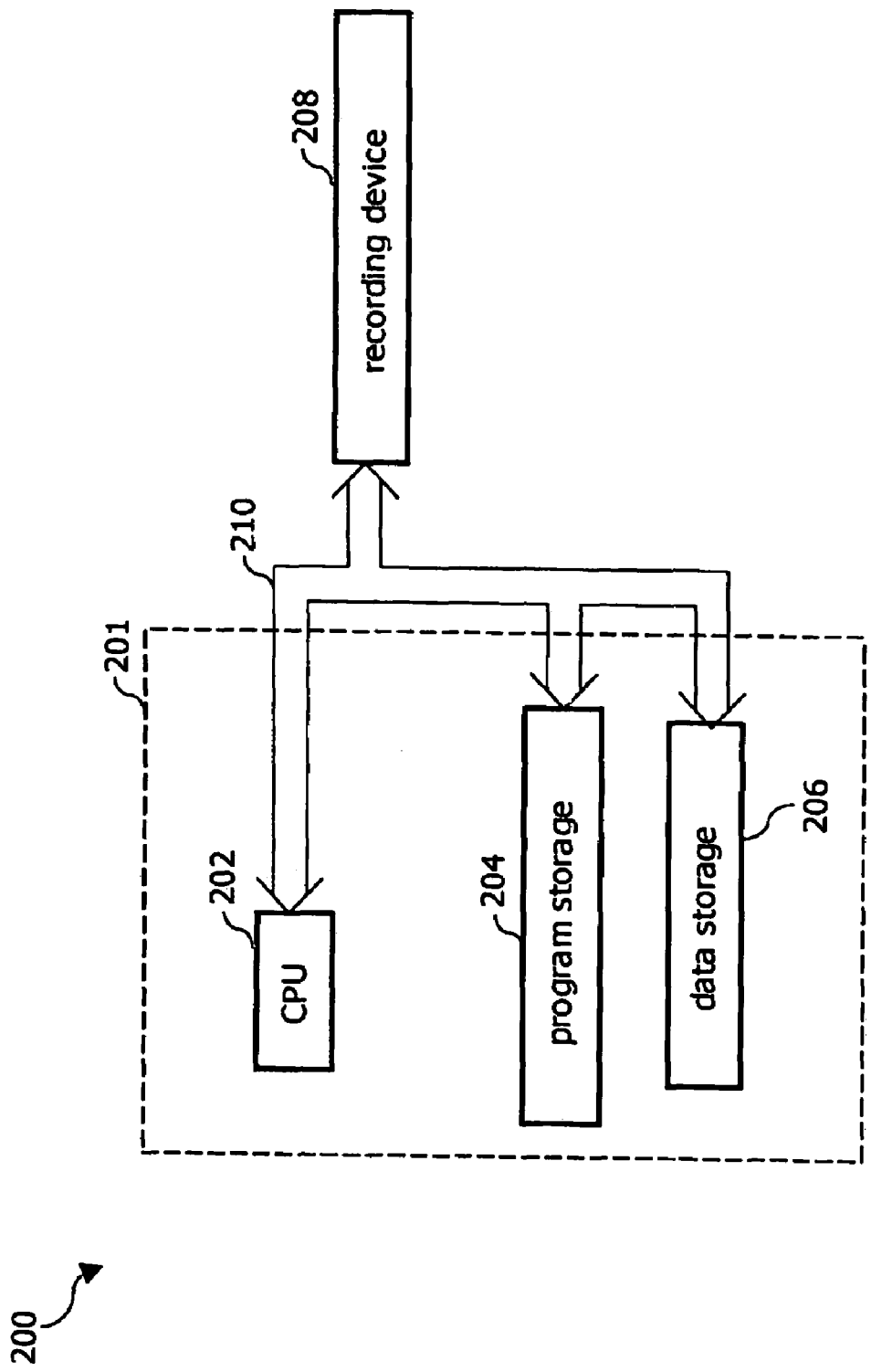
FIG. 2 is a schematic representation of a system for managing the recording capacity of a recording device.

FIG. 2 shows a schematic representation of a system for managing the recording capacity of a recording device. The system, shown generally at 200, comprises a processing means 201, an interface 210 and a recording device 208. The processing means 201 comprises CPU 202, program storage 204 and data storage 206 all interconnected by interface 210. Under control of instructions contained in program storage 204 the processing means 201 is operable, when scheduling the recording of an item, to:

receive data representing a plurality of recording modes of the recording device, for example sent from recording device 208 via interface 210;

obtain the unreserved recording capacity of the recording device, for example from data held in data storage 206 comprising the reserved items and data received from recording device 208 comprising the total capacity of the recording device media;

for each recording mode, calculate the capacity required to record the item using said mode;

identify recording modes for which the calculated capacity is less than the unreserved recording capacity;

where one or more recording modes are identified, select an identified recording mode based on a preference, for example where the preference is held as a default set of parameters in data storage 206; and schedule the recording of the item using the selected recording mode, for example recording in data storage 206 data corresponding to the new reserved (pending) item;

and, when recording an item to:

receive data representing a plurality of recording modes of the recording device;

select a recording mode to record an item based on a preference;

commence the recording of the item using the selected recording mode, for example by issuing suitable commands to the recording device 208 via interface 210; and while recording the item:

obtain the unreserved recording capacity; and where the unreserved recording capacity is less than a pre-determined amount (for example the value of the amount is stored in data storage 206), adapt at least one reserved item (for example, by selecting a reserved item and adapting said item according to the preference).

The interface 210 is operable to exchange data between the processing means and the recording device and the recording device 208 is operable to co-operate with the processing means. A suitable processing means is one which is connected (via interface 210) to, but remote from, the recording device; examples include another CE device or a network entity such as a server (for example an Internet server). Consider a service provider located on the Internet who provides capacity management for a recording device located at a user's home; this represents an enhancement to existing EPG-driven Personal Video Recorders (PVR) which manage only the selection of content for recording on the PVR. Alternatively, the processing means can be integrated with the recording device.

Figure 3:
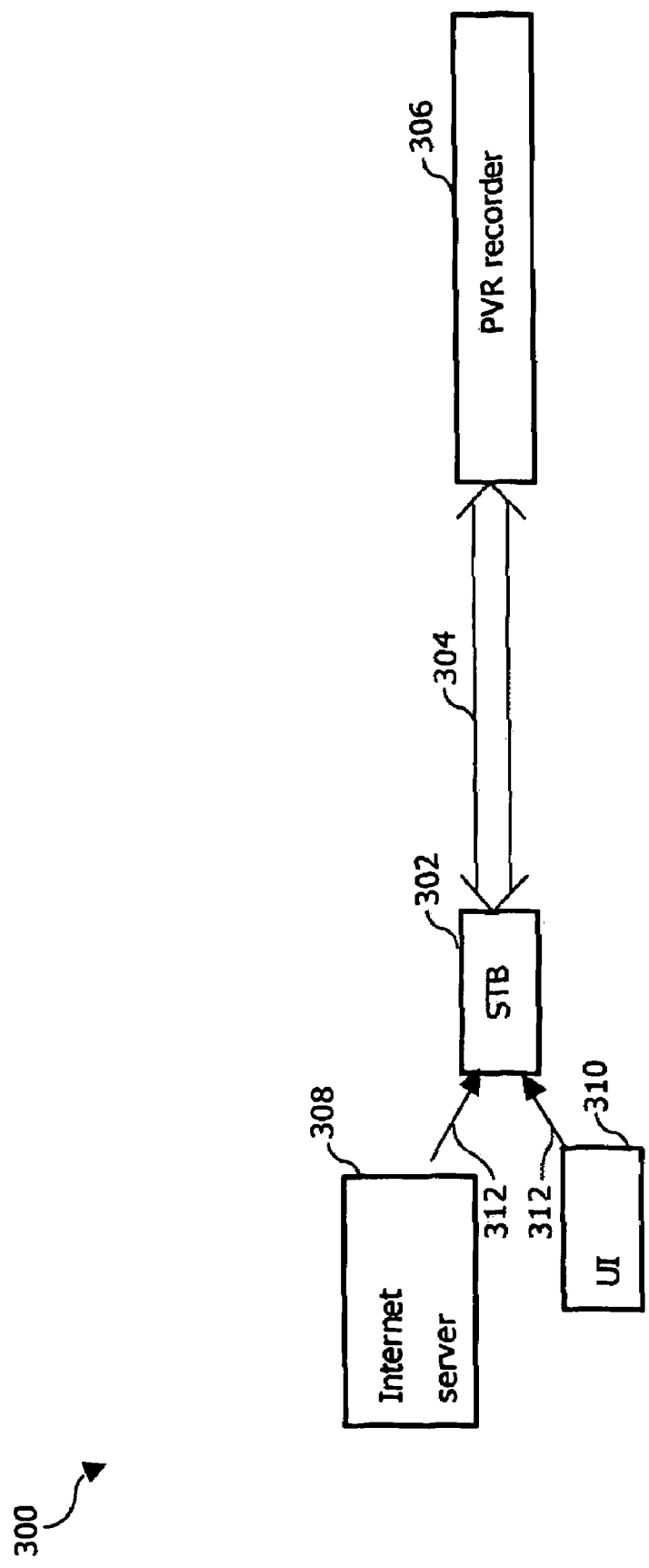
FIG. 3 is an application of the system of FIG. 2 for managing the recording capacity of a recording device.

FIG. 3 shows an application of the system of FIG. 2 for managing the recording capacity of a recording device. The application, shown generally at 300, comprises a set top box (STB) 302, a Scart interface 304 supporting Project 50 messaging and a PVR 306 (HDD based recording device). In operation, the STB 302 receives data representing a plurality of recording modes from the PVR 306 via Project 50 messages sent over the Scart interface 304. The STB 302 can also instruct the PVR, again via Project 50 messages, for example to programme timer blocks to schedule pending items, to control recording functions, to interrogate status, etc. Using Project 50 messaging allows further recording devices to be connected to the system without risking conflict or confusion as to which device is which. Use of Project 50 also permits simple enhancement (for example, by means of software) to existing products to implement the proposed methods. The above discussion relating to the use of Project 50 messages over Scart equally applies to the use of CEC messages over HDMI, Alternative interfaces are also suitable including wired interfaces such as USB, RS232, Ethernet and wireless interfaces such as WiFi, ZigBee, IEEE802.11.

In the example, the processing means 201 of FIG. 2 is contained in the STB 302 and/or an internet server 308; that is, some sharing of processing functions between these devices is possible and perhaps desirable (for example, the internet server could manage processing tasks specific to the content items). In the example the STB receives preference data 312 (which may replace or augment default preference data embedded in the STB), such preference data being received from the internet server 308 or from a user interface 310. Clearly, the Internet server or user interface could be connected to another device in the system, and the preference data conveyed to the STB via Project 50 messages.

Figure 4:
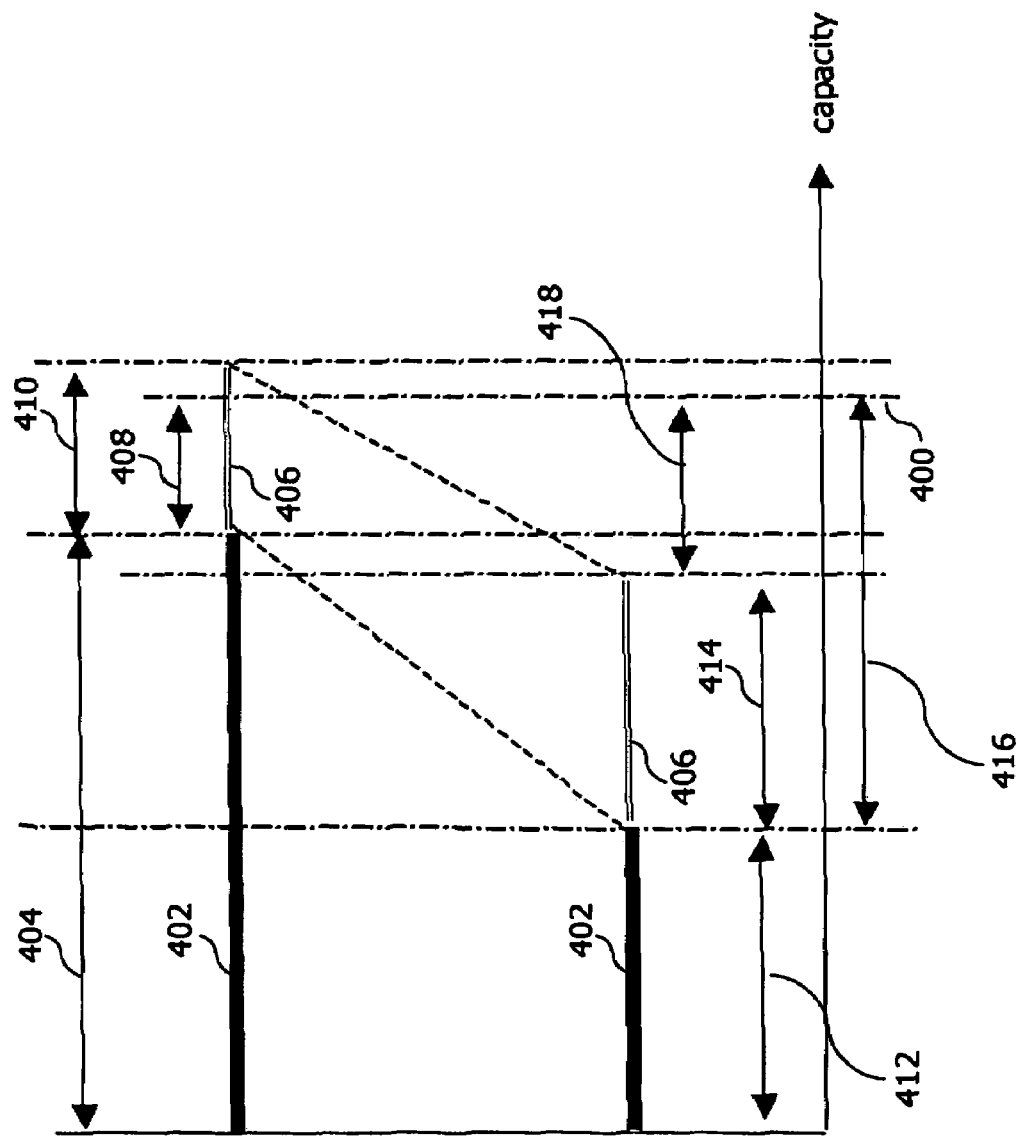

FIG. 4 is a schematic representation of an adaptation of a reserved item according to the method of FIG. 1a. The representation is graphical and depicts capacity of the recording device measured along the abscissa, wherein the total capacity 400 of the recording device is indicated. A reserved item 402, comprising either a pending item or a recorded item, has capacity 404, resulting in an unreserved recording capacity 408 of the recording device. Other items may also occupy capacity of the recording device, but for clarity these are not shown in the Figure. An additional item 406 is to be scheduled according to the method of FIG. 1a. For each recording mode of the recording device, the method calculates the capacity required to record the item. This may result in a range of calculated capacities for the item 406. The figure shows the smallest calculated capacity 410 for the item 406, which capacity exceeds the unreserved recording capacity 408. This means that no suitable recording mode can be identified to schedule item 406 without adapting at least one of the reserved items, which items include item 402. In the example, item 402 is adapted as shown to have a revised capacity 412 which in turn results in a new unreserved recording capacity 416 being obtained. This capacity 416 is now sufficient not only to accommodate the smallest calculated capacity 410 for item 406 but perhaps also one or more other calculated capacities for the item 406 using other recording modes based on the preference. For the example shown, another recording mode is in fact selected resulting in item 406 having capacity 414 (which is larger then capacity 408). Once item 406 is scheduled the obtained unreserved recording capacity is then 418. Typically a recording mode selection will be made to implement a strategy whereby items are recorded at the best available quality, as discussed earlier; alternative strategies are also possible, for example to schedule each item using the smallest calculated capacity (such as 408 in the present example) so as to maximise the number of items that can be scheduled for the given total capacity of the recording device. Correspondingly, when a scheduled item is actually recorded, an alternative recording mode may be selected based on the preference to ensure the item is recorded at the best available quality, thereby allowing subsequent re-recording as required, as discussed earlier.

Figure 5:
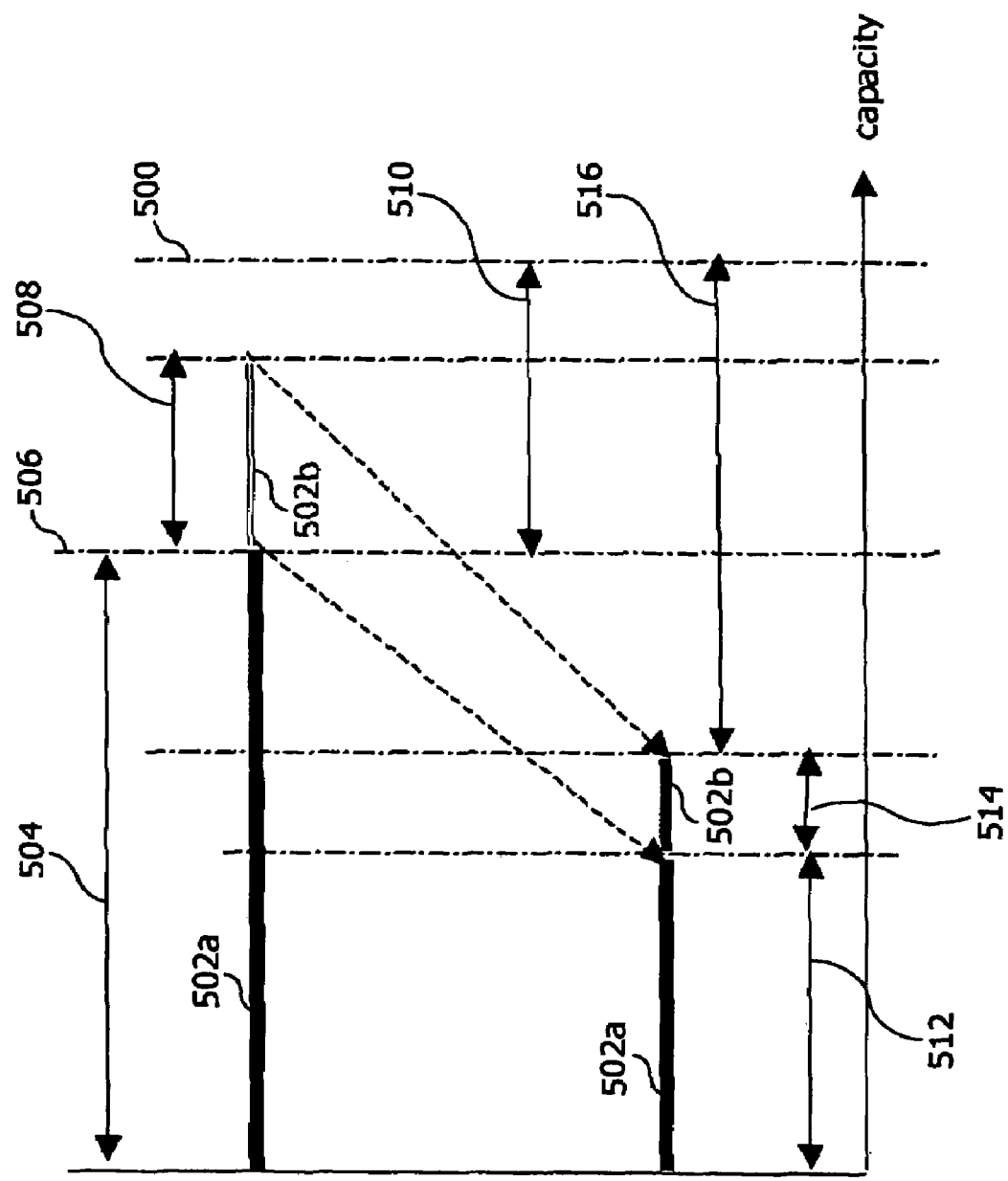
FIG. 5 is a schematic representation of an adaptation of a reserved item according to the method of FIG. 1b.

FIG. 5 shows a schematic representation of an adaptation of a reserved item according to the method of FIG. 1b. The representation is graphical and depicts capacity of the recording device measured along the abscissa, wherein the total capacity 500 of the recording device is indicated. Item 502 (comprising 502a and 502b) is presently being recorded on the recording device using a first recording mode and comprises a portion 502a with capacity 504 which has already been recorded and portion 502b which remains to be recorded; noting that the duration of portion 502b (and therefore its capacity 508 using the first recording mode) can be unknown. The junction 506 of the two portions corresponds to the present recording position and is at a point where the unreserved recording capacity 510 of the recording device becomes less than a pre-determined amount. The pre-determined amount can correspond to the recording capacity needed for the item using the first recording mode, where this is known. Alternatively, the pre-determined amount corresponds to an amount of recording time using the first recording mode; this option being useful where the precise duration of item 502 is unknown. At point 506, the method decides to adapt at least one reserved item, which item comprises a pending scheduled item or a previously recorded item. In the depicted example, the reserved item to be adapted is a pending scheduled item comprising the pending portion 502b of the presently recorded item 502. A second (that is, alternative) recording mode is selected based on the preference and the recording of the item 502 is continued using the second recording mode resulting in the recording of portion 502b with capacity 514. Preferably and as is shown in the figure, portion 502a is re-recorded (perhaps at some later time) using the second recording mode resulting in portion 502a having capacity 512, in this case being smaller than its original capacity 504 and thereby releasing capacity for possible use by another item. In the example where both portions 502a and 502b are recorded using the second recording mode, the unreserved recording capacity is shown at 516.

The foregoing method and implementation are presented by way of example only and represent a selection of a range of methods and implementations that can readily be identified by a person skilled in the art to exploit the advantages of the present invention.

In the description above and with reference to FIGS. 1a and 1b there is disclosed a method for managing the recording capacity of a recording device, independently of user involvement, comprising receiving 104, 154 data representing a plurality of recording modes of the recording device; identifying 114 one or more recording modes which may be used to record an item using the prevailing unreserved recording capacity; and arranging 128, 162 for the recording of the item using a recording mode selected 122, 160 based on a preference, the arrangement including, where necessary, adapting 120, 170 one or more pending or previously recorded items.

The invention claimed is:

1. A method for managing the recording capacity of a recording device when scheduling the recording of an item, comprising:
   receiving data representing a plurality of recording modes of the recording device;
   for each recording mode of the plurality of recording modes, calculating a capacity required to record said item using the respective recording mode;
   obtaining a prevailing unreserved recording capacity of the recording device;
   identifying, for the recording of said item, a number of recording modes of the plurality for which a corresponding calculated capacity is less than the prevailing unreserved recording capacity; and
   responsive to one or more recording modes of the plurality being identified for the recording of said item,
      selecting a particular identified recording mode of the one or more identified recording modes based on a preference, wherein the preference includes criteria that define a set of acceptable recording modes associated with said item; and
      responsive to the particular identified recording mode being selected, scheduling the recording of said item using the selected recording mode, wherein the scheduled recording of said item becomes a reserved item, and
   wherein the receiving, obtaining, identifying, selecting, and scheduling are independent of user involvement.

2. A method as claimed in claim 1, further comprising:
   responsive to an identified recording mode not being selected, adapting at least one reserved item and repeating the method commencing with the obtaining step.

3. A method for managing the recording capacity of a recording device when recording an item, comprising:
   receiving data representing a plurality of recording modes of the recording device;
   selecting a recording mode of the plurality of recording modes based on a preference, wherein the preference includes criteria that define a set of acceptable recording modes associated with said item;
   commencing the recording of said item using the selected recording mode; and
   while recording the item:
      obtaining a prevailing unreserved recording capacity of the recording device; and
      responsive to the prevailing unreserved recording capacity for recording of said item using the selected recording mode being less than a pre-determined amount, adapting at least one reserved item, wherein any initial portion of said item already recorded using the selected recording mode becomes a reserved item subject to being adapted; and
      determining whether recording of said item is finished, wherein (i) responsive to being finished, ending the recording, and (ii) responsive to being unfinished, continuing the recording commencing with the obtaining step, and wherein the receiving, selecting, commencing, recording, obtaining, adapting, determining, ending, and continuing are independent of user involvement.

4. A method as claimed in claim 3, wherein the pre-determined amount corresponds to the recording capacity needed for the item using the selected recording mode.

5. A method as claimed in claim 3, wherein the pre-determined amount corresponds to 1 minute of recording time using the selected recording mode.

6. A method as claimed in claim 3, wherein the pre-determined amount corresponds to 15 minutes of recording time using the selected recording mode.

7. A method as claimed in claim 3, wherein the pre-determined amount corresponds to 60 minutes of recording time using the selected recording mode.

8. A method as claimed claim 3, wherein the at least one reserved item comprises said item presently being recorded and adapting said item comprises:
   selecting an alternative recording mode based on the preference; and
   continuing the recording of said item to record a remaining portion of said item using the selected alternative recording mode.

9. A method as claimed in claim 2, wherein the at least one reserved item comprises an item previously recorded and adapting said item comprises:
   selecting an alternative recording mode for said item previously recorded based on the preference; and
   re-recording said item using the selected alternative recording mode.

10. A method as claimed in claim 2, wherein the at least one reserved item comprises a pending item and adapting said item comprises:
    selecting an alternative recording mode based on the preference.

11. A method as claimed in claim 2, wherein adapting the at least one reserved item comprises:
    deleting the reserved item based on the preference.

12. A method as claimed in claim 1, wherein prior to the step of selecting, the method further comprises receiving the preference.

13. A system for managing the recording capacity of a recording device, the system comprising:
    a processing means operable, when scheduling the recording of an item, to:
       receive data representing a plurality of recording modes of the recording device;
       obtain a prevailing unreserved recording capacity of the recording device;
       for each recording mode of the plurality of recording modes, calculate a capacity required to record said item using the respective recording mode;
       identify, for the recording of said item, a number of recording modes of the plurality for which a corresponding calculated capacity is less than the prevailing unreserved recording capacity;
       responsive to one or more recording modes of the plurality being identified for the recording of said item, select a particular identified recording mode of the one or more identified recording modes based on a preference, wherein the preference includes criteria that define a set of acceptable recording modes associated with said item; and
       responsive to the particular identified recording mode being selected, schedule the recording of said item using the selected recording mode, wherein the scheduled recording of said item becomes a reserved item, and
    wherein the receiving, obtaining, identifying, selecting, and scheduling are independent of user involvement;
    and, when recording said item to:
       receive data representing the plurality of recording modes of the recording device;
       select a recording mode of the plurality of recording modes to record said item based on the preference;
       commence the recording of said item using the selected recording mode; and
       while recording the item:
          obtain the prevailing unreserved recording capacity of the recording device; and
          responsive to the prevailing unreserved recording capacity for recording of said item using the selected recording mode being less than a pre-determined amount, adapt at least one reserved item, wherein any initial portion of said item already recorded using the selected recording mode becomes a reserved item subject to being adapted; and
          determine whether recording of said item is finished, wherein (i) responsive to being finished, end the recording, and (ii) responsive to being unfinished, continue the recording commencing with the obtaining step, and
       wherein the receiving, selecting, commencing, recording, obtaining, adapting, determining, ending, and continuing are independent of user involvement;
    an interface operable to exchange data between the processing means and the recording device; and
    a recording device operable to co-operate with the processing means.

14. A system as claimed in claim 13, wherein the recording device is operable to send data to the processing means representing the plurality of recording modes.

15. A system as claimed in claim 13, wherein the processing means is operable to receive the preference.

16. A system as claimed in claim 15, wherein the preference is received from a user interface.

17. A system as claimed in claim 15, wherein the preference is received from a network.

18. A system as claimed in claim 13, wherein the interface comprises Project 50 messages conveyed over Scart.

19. A system as claimed in claim 13, wherein the interface comprises CEC messages conveyed over HDMI.

* * * * *